United States Patent
Willis et al.

(10) Patent No.: US 12,515,169 B2
(45) Date of Patent: Jan. 6, 2026

(54) VACUUM GENERATION PROCESS FOR DEPOSITION OF BIOMEDICAL IMPLANT MATERIALS

(71) Applicant: Zimmer, Inc., Warsaw, IN (US)

(72) Inventors: Edward M. Willis, Hoboken, NJ (US); William MacDonald, Bernardsville, NJ (US); Sheng Ma, Wayne, NJ (US); Ashley Lutero Abanilla, Union, NJ (US); Mrugesh Shroff, Plainfield, NJ (US); Delroy F. Green, Stanhope, NJ (US)

(73) Assignee: Zimmer, Inc., Warsaw, IN (US)

( * ) Notice: Subject to any disclaimer, the term of this patent is extended or adjusted under 35 U.S.C. 154(b) by 887 days.

(21) Appl. No.: 17/358,241

(22) Filed: Jun. 25, 2021

(65) Prior Publication Data
US 2021/0402351 A1 Dec. 30, 2021

Related U.S. Application Data

(60) Provisional application No. 63/044,647, filed on Jun. 26, 2020.

(51) Int. Cl.
*B01D 53/78* (2006.01)
*B01D 46/10* (2006.01)
(Continued)

(52) U.S. Cl.
CPC .......... *B01D 53/78* (2013.01); *B01D 46/10* (2013.01); *B01D 53/346* (2013.01);
(Continued)

(58) Field of Classification Search
None
See application file for complete search history.

(56) References Cited

U.S. PATENT DOCUMENTS

| | | | | |
|---|---|---|---|---|
| 4,636,401 A | * | 1/1987 | Yamazaki | ......... H01L 21/67017 427/255.393 |
| 4,725,204 A | * | 2/1988 | Powell | ................ C23C 16/4412 417/205 |

(Continued)

OTHER PUBLICATIONS

Vac Aero-Dry Pumps: Screw Type. Vac Aero International Inc. [online] [retrieved on Jun. 24, 2024]. ppgs. https://vacaero.com/information-resources/vacuum-pump-technology-education-and-training/191960-dry-pumps-screw-type.html (Year: 2019).*

(Continued)

*Primary Examiner* — Jelitza M Perez
(74) *Attorney, Agent, or Firm* — SCHWEGMAN LUNDBERG & WOESSNER, P.A.

(57) ABSTRACT

The present disclosure includes a system for processing waste from a chemical vapor deposition process. The system can include an inlet configured to be connected to one or more chemical vapor deposition systems, the inlet configured for receiving an effluent comprising one or more waste gases, a vacuum component in fluid communication with the inlet, the vacuum component configured for maintaining a vacuum of about 0.5 Torr to about 3.5 Torr and actuatable for removing the one or more waste gases from the one or more chemical vapor deposition systems, and a fluid line fluidly connecting the inlet to the vacuum component; and a controller in communication with the vacuum component.

16 Claims, 2 Drawing Sheets

(51) Int. Cl.
*B01D 53/34* (2006.01)
*C23C 16/44* (2006.01)
(52) U.S. Cl.
CPC .. *B01D 2258/0216* (2013.01); *B01D 2273/28* (2013.01); *C23C 16/4412* (2013.01)

(56) References Cited

U.S. PATENT DOCUMENTS

| | | | | |
|---|---|---|---|---|
| 5,616,208 | A * | 4/1997 | Lee | H01L 21/67017 134/1.1 |
| 5,904,757 | A * | 5/1999 | Hayashi | B01D 45/08 55/446 |
| 6,063,442 | A | 5/2000 | Cohen et al. | |
| 6,562,109 | B2 * | 5/2003 | Livingston | B01D 45/14 55/438 |
| 9,277,998 | B2 | 3/2016 | Vargas et al. | |
| 10,039,619 | B2 | 8/2018 | Vargas et al. | |
| 2010/0071548 | A1 * | 3/2010 | Smith | C23C 16/4412 95/3 |
| 2010/0101414 | A1 * | 4/2010 | Smith | B01D 53/68 95/156 |
| 2013/0139690 | A1 * | 6/2013 | Ohuchi | B01D 53/75 96/108 |
| 2013/0171919 | A1 * | 7/2013 | Shinohara | F04B 49/06 454/49 |
| 2013/0276702 | A1 * | 10/2013 | Carlson | C23C 16/4412 422/169 |
| 2014/0352820 | A1 * | 12/2014 | Nakazawa | B01D 53/74 422/168 |
| 2017/0200622 | A1 * | 7/2017 | Shiokawa | C23C 16/52 |

OTHER PUBLICATIONS

Pierson, Hugh, "Handbook of Chemical Vapor Deposition", Noyes Publications, 1999. Principles, Technology, and Applications Second Edition, (1999), 505 pgs.

* cited by examiner

VACUUM GENERATION PROCESS FOR DEPOSITION OF BIOMEDICAL IMPLANT MATERIALS

CLAIM OF PRIORITY

This application claims the benefit of U.S. Provisional Patent Application Ser. No. 63/044,647, filed on Jun. 26, 2020, the benefit of priority of which is claimed hereby, and which is incorporated by reference herein in its entirety.

BACKGROUND

Chemical vapor deposition (CVD) can be used for uniform deposition of multiple atomic layers of a metal onto a substrate. CVD includes vacuum deposition of thin films on a substrate. In general, CVD can include exposing the substrate to one or more volatile precursors, which react or decompose onto the substrate surface to create the deposit. CVD can work with porous or roughly finished substrates for achieving infiltration of those substrates, and can be applied at temperatures which are lower than the melting point of the underlying metal.

Vapor deposition is used in many industries to apply a thin film of a refractory metal onto a substrate product. Refractory metals are a class of metals known for their high melting points, typically above 1850° C. The CVD process may use a precursor gas such as a halogen in order to create a vapor phase of the metal. For example, CVD can be used to apply thin films of a refractory metal onto an implant material substrate, such as application of tantalum with a chlorine precursor gas.

The CVD process can also include a secondary reduction phase, using a reductant gas within a controlled vacuum level environment in order to optimize deposition rates. The resulting process effluent may include any combination of fluids in the form of reductant gases, precursor gases, and vapor compounds, and solids in the form of metallic precipitates. As a consequence, residuals should be processed downstream to efficiently and safely process the effluent and provide the environment needed for CVD reactions to occur.

SUMMARY OF THE DISCLOSURE

The present disclosure provides systems and methods for vacuum generation and processing of chemical vapor deposition (CVD) residuals that can be used as a downstream process for vapor deposition of refractory metals.

CVD processes can be used to produce metal foam implants, such as for knee, joint, hip, or other bone implant materials. Metal foam implants are made of highly porous biomaterial including elemental tantalum, which can have structural, functional, and physiological properties similar to that of bone.

Processing of metal foam implants with CVD can require specific atmospheric settings and controls for the chemical reaction to take place to generate deposition of a refractory metal coating on such an implant material. The CVD process can, for example, require a high vacuum level, such as to remove CVD waste gases and solids, known as CVD effluent.

This vacuum can be done, for example, with a vacuum priming pump for initial vacuum, and then consistently with a liquid ring booster system combined with process byproduct neutralization. Alternatively, a vacuum can be generated with a dry vacuum screw and flushing sequence. The system and methods described herein can provide a consistent vacuum control while processing halogen precursors or other CVD gaseous byproducts. By comparison, ether standalone vacuum units rarely provide a consistent vacuum at the level required to process CVD effluent.

The disclosed processes and systems can accommodate a variety of types of deposition furnace configurations that applies a refractory metal, such as niobium, molybdenum, tantalum, tungsten, rhenium, titanium, vanadium, chromium, zirconium, hafnium, ruthenium, rhodium, osmium or iridium, that might be applied to an implant material. These processes and systems can be used with any halogen precursor, such as fluorine, chlorine, bromine or iodine, used in CVD. Additionally, the processes and systems discussed herein can be used to process either a reductant gas, such as hydrogen or reductant metal, such as cadmium, zinc or magnesium, that could be used in a CVD process.

In an example, a system for processing waste from a chemical vapor deposition process can include an inlet configured to be connected to one or more chemical vapor deposition systems, the inlet configured for receiving an effluent comprising one or more waste gases, a vacuum component in fluid communication with the inlet, the vacuum component configured for maintaining a vacuum of about 0.5 Torr to about 3.5 Torr and actuatable for removing the one or more waste gases from the one or more chemical vapor deposition systems, a fluid line fluidly connecting the inlet to the vacuum component, and a controller in communication with the vacuum component.

In an example, a method of processing waste from a chemical vapor deposition process can include receiving effluent from a chemical vapor deposition system, the effluent comprising one or more waste gases and one or more waste solids, applying a vacuum to the effluent, and expelling the effluent.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure describes, among other things, a system for processing chemical vapor deposition (CVD) waste. The CVD process can use a precursor gas, such as a halogen, to induce a vapor phase of the metal during the CVD process. The CVD process can also use a reductant gas within a controlled vacuum level environment to induce optimal deposition rates, such as in a secondary reduction phase. The CVD process can result in an effluent that can include any combination of fluids from the reductant gases, precursor gases, other vapor compounds, and solids in the form of metallic precipitates. Disclosed herein is a downstream processing system utilizing a vacuum for processing residuals in the effluent efficiently and safely process that waste.

For example, in a tantalum coating process, gaseous chloride can be used to induce coating of tantalum onto an implant substrate material. In this type of CVD, the metal can be tantalum and the precursor gas can be chloride ($Cl_2$). The furnace can be heated up to high temperatures of upwards of 700-1000° C. to induce the desired reactions. For example, the chloride and tantalum can react to take the form of tantalum chloride gas ($TaCl_4$).

A reactant gas, such as hydrogen gas ($H_2$) can be used. In the furnace, the hydrogen gas ($H_2$) can be reduced to protons ($H^+$). The protons can interact with chloride, forming hydrogen chloride gas (HCl(g)), and allow for reformation of tantalum on the surface of the substrate being coated.

Thus, the effluent can include produced hydrogen chloride gas, which is a highly corrosive waste gas. Additional waste gases can include nitrogen or oxygen from air, and unreacted hydrogen gas caused by inefficiencies in the chloride-hydrogen reaction. In addition, solid can be included in the effluent, such as process residue like tantalum chloride ($Ta_2Cl_5$), a white powder, or other tantalum oxy-chlorides, which can take the form of green solids.

Figure 1:
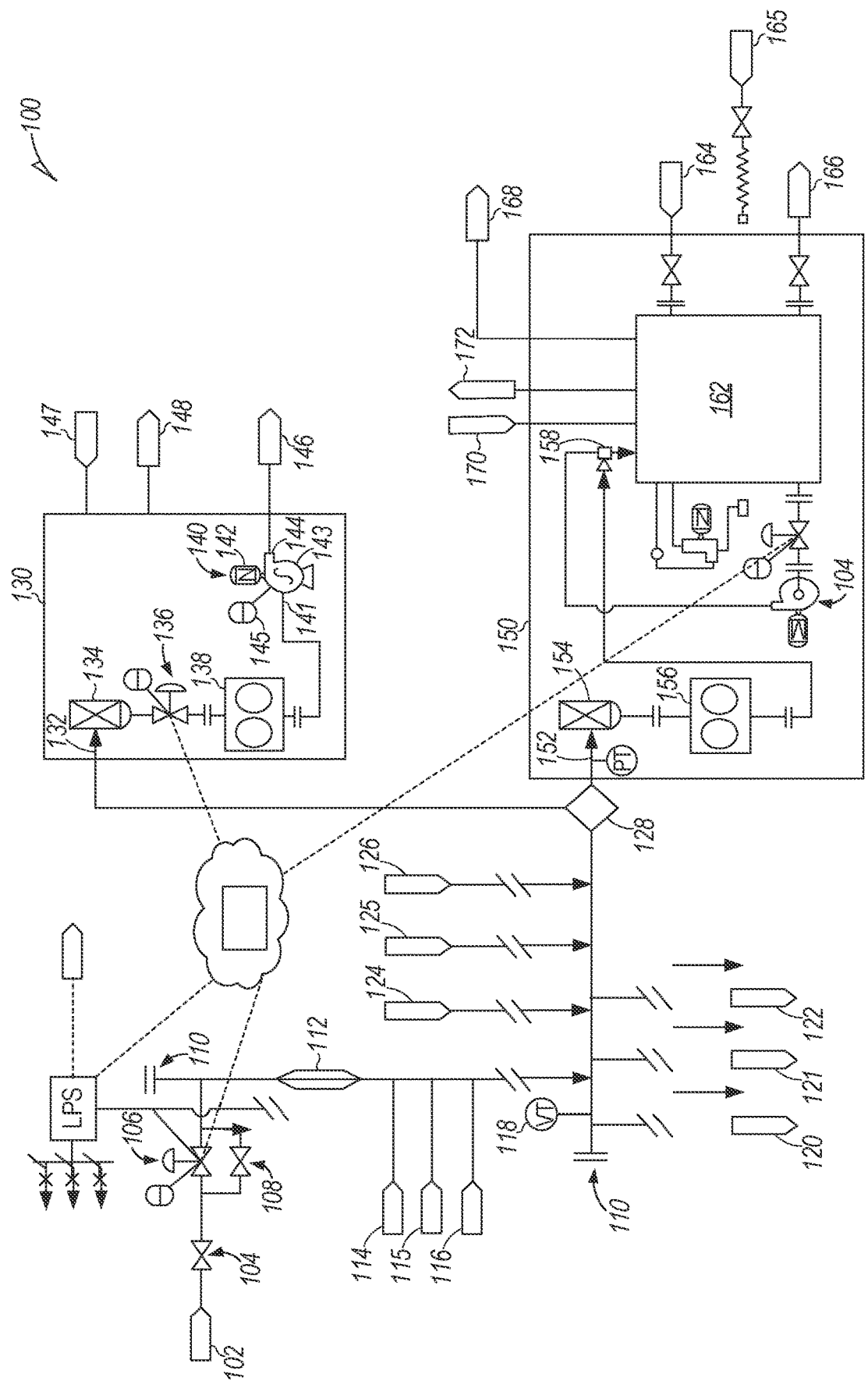
FIG. 1 illustrates a schematic diagram of a chemical vapor deposition effluent processing system.

FIG. 1 illustrates a schematic diagram of a chemical vapor deposition effluent processing system 100, which can be used for processing of CVD effluent, such as effluent produced in a tantalum coating process leveraging chloride. System 100 can include an inlet 102, valves 104, 106, 108, one or more solids residue control system 110, a double walled containment section 112, additional inlets from CVD furnaces 114, 115, 116, a vacuum transducer 118, outlets to additional vacuum systems 120, 121, 122, inlets from additional vacuum systems 124, 125, 126, and an outlet 128 to main vacuum systems 130, 150. The system 100 can additionally include a data acquisition, a power source, and a controller.

Main vacuum systems 130, 150, can include a dry screw vacuum system 130 and a liquid ring tank vacuum system 150. The dry screw vacuum system 130 can include an inlet 132, a filter 134, valves 136, a mechanical pump 138, a dry screw pump 140, a waste outlet 142, and heat exchange ports 144, 146. The liquid ring tank vacuum system 150 can include an inlet 152, a filter 154, a mechanical pump 156, valves 158, a second pump 160, a liquid ring tank 162, a tank water source 164, a tank water reclamation 166, a waste outlet 168, and heat exchange ports 170, 172.

In the system 100, effluent can enter through the inlet 102 from a CVD furnace (or alternatively enter through any of CVD furnaces 114, 115, 116). The effluent can travel along through and be regulated by the valves 104, 106, 108. Any solid residue in the effluent can be dropped out at one of the solid residue control systems 110. The double walled containment section 112 can guard against system leaks, to prevent corrosive effluent from escaping system 100 prior to processing. The effluent can enter the vacuum systems 130, 150, through the outlet 128, or alternatively enter the additional vacuum systems 124, 125, 126, for processing of the gaseous components of the effluent.

In the vacuum system 130, the effluent can enter through the inlet 132, and be filtered at the filter 134, where remaining contaminants or solid waste can be removed prior to the effluent reaching the mechanical pump 138 and the dry screw pump 140 through the valve 136. The pumps 138, 140, can maintain a vacuum and pull the effluent through the system. The effluent can be pulled out the waste outlet 142, where it can be scrubbed or incinerated, and gaseous waste in the effluent can be neutralized. The heat exchange ports 144, 146, can temperature regulate the vacuum system 130.

Likewise, in vacuum system 150, the effluent can enter through the inlet 152 and be filtered at the filter 154 to prevent solids or other contaminants from clogging or damaging the mechanical pump 156 and the second pump 160. The pumps 156, 160, can help create and maintain the vacuum in the system 100. The effluent can run through various valves 158 into the liquid ring tank 162, where the effluent's gaseous components can be neutralized. The liquid ring tank 162 can be maintained through the tank water source 164 and the tank water reclamation 166. Additional waste from the effluent can exit the liquid ring tank 162 through the waste outlet 168. The heat exchange ports 170, 172, can temperature regulate the vacuum system 150.

The inlet 102 into system 100 can be a vacuum outflow pipe from a chemical vapor deposition (CVD) furnace that is appropriately sized for maximum expected process effluent flow expected from the vapor deposition furnace.

In system 100, more than one CVD furnace can be incorporated. A multitude of CVD furnaces can be used with the system 100, each having their own inlet into the system 100. Additional inlets from CVD furnaces 114, 115, 116, can connect the effluent processing system 100 to one or many CVD furnaces. These inlets 114, 115, 116, can include multiple installations and be sized appropriately for effluents from some or all of the furnaces to be processed in the same system 100.

The valve 104 can receive effluent from inlet 102. The valve 104 can include a manual valve system that is configured to allow the regulation of vacuum outflow, such as preventing vacuum outflow when maintenance operations are being performed on a CVD furnace connected through the inlet 102. If a multitude of CVD furnaces are connected to the system 100, one or more valves like the valve 104 can be associated with each CVD furnace inlet. Thus, while a portion of the valves can be closed to shut off access to particular CVD furnaces, while allowing other CVD furnaces to continuously run and the effluent from those active, running CVD furnaces to be processed. In this way, a single effluent processing system 100 can be used simultaneously with several CVD furnaces operating at different times.

Similarly, the controlling valves 106 and 108 can make up a controlling valve system. The controlling valve system can allow for the regulation of the vacuum level within the CVD furnace, as created by the vacuum systems 130 and 150.

Effluent from CVD furnaces can often contain solid residuals, such as metal chlorides. For example, in a tantalum coating process using chloride gas, tantalum chloride ($Ta_2Cl_5$) can precipitate in the CVD process as a white powder. This powder can often travel with gaseous wastes when flowing out of a CVD furnace and into the effluent processing system 100. One or more solid residue control systems 110 can be incorporated into the system 100 to clean and control the solids residues travelling in the effluent, upstream of the vacuum systems. These solid residue control systems 110 can include manual cleanout points, automated cleanout methods that will remove static residues to mitigate vacuum system clogging by precipitates, or combinations thereof.

Effluent from CVD furnaces can include highly corrosive gases. For this reason, the piping in the system 100 can be manufactured of pure materials that will not react with the effluent gases, or coated with anti-corrosion coatings. The piping can be made of materials with mechanical properties that can withstand stresses caused by the high vacuum level.

Additionally, a double walled containment system, such as the system 112, can be incorporated as a safety feature. The double walled containment system 112 can include a purge capability, and a leak alert functionality when any contained processing gases are toxic.

One or more vacuum transducers 118 can be located throughout the system 100. The vacuum transducers 118 can monitor conditions in the system 110, and in conjunction with a controller, control automated functions of the system 100. The vacuum transducers 118 can allow for an alert system coupled with the controller, such that when the pressure in a particular area of the system 100 changes drastically, an alert can be triggered.

The outlet 128 to the vacuum systems 130 and 150 can allow for flow of effluent into those vacuum systems for processing. The outlet system 128 can connect the system 100 to the vacuum systems 130, 150, so as to allow a consistent vacuum as required for processing of CVD effluent.

In system 100, a multitude of vacuum systems can be in line with and interacting with the system 100. For example, additional vacuum systems can be connected to the system 100 by outlets 120, 121, 122, to those vacuum systems. Alternatively, vacuum outflow pipes 124, 125, 126 can be connected to the main line of the system 100. Multiple vacuum systems can be connected together via a manifold system to accept the aggregate effluent flows occurring from the vacuum outflow piping system. Multiple vacuum outflow pipes can be connected together via a manifold section for unified processing of gases and solids, as discussed in reference to FIG. 2.

The vacuum systems in the effluent processing system 100 can create a deep vacuum for processing of CVD effluent, such as a vacuum of about 0.5 Torr to about 3.5 Torr, or a vacuum of about 1.0 Torr to about 3.0 Torr. A vacuum system can include one or multiple pumps inline to produce an appropriate vacuum level needed for incoming flow capacity. The system 100 can include a liquid ring tank system for neutralizing effluent, or can be connected to a separate scrubbing system for processing of gas and liquid effluent.

The dry screw vacuum system 130 can include a dry screw pump, and optionally an automatic flush add-on, a nitrogen purge add-on, and an air scrubber. The dry screw vacuum system 130 can include an inlet 132, a filter 134, valves 136, a mechanical pump 138, a dry screw pump 140, a waste outlet 142, and heat exchange ports 144, 146. The dry screw vacuum system 130 can produce a vacuum level from about 0.5 Torr to about 3.5 Torr during CVD processing. Dry screw vacuum system 130 can additionally remove acidic and corrosive gases and particles from an exhaust system such as system 100.

The effluent can enter the dry screw vacuum system 130 through the inlet 132. The filter 134 can filter or remove precipitates. The filter 134 can be an inlet trap, a knockout pot, or other type of filter depending on the capacity of solids removal needed in the system 100. The valves 136 can regulate flow of effluent within the dry screw vacuum system 130 leading up to the mechanical pump 138 and the dry screw pump 140.

In system 130, the mechanical pump 138 and the dry screw pump combined provide the vacuum for the system 100. Vacuum capacity can be attained from any combination of mechanical pump, roots pump, rotary vane pump, venturi water pump, dry vacuum (e.g., lobe or screw) pumps, or other pumps based upon the needs of the CVD system chosen. One or multiple pumps can be placed in-line on a given system to provide the vacuum level capacity required as well as incorporating design needs for downstream effluent processing.

For example, dry screw vacuum system 130 can include rotary screw pump 140 driven by a variable pitch drive screw and a variable pitch driven screw. Specifically, the rotary screw pump 140 can include a gas inlet 141, a motor 142, a cylindrical casing 143, an exhaust port 144, and various skid mounted devices 145, such as isolation valves, inlet purge valves, seal gas valves, solenoid valves.

The rotary screw pump 140 can be a single stage, direct-driven, water-cooled, positive displacement, rotary screw pump. This rotary screw pump 140 can include a variable pitch drive screw and a variable pitch driven screw mounted inside the cylinder casing 143, driven by the motor 142. The two screws can rotate in opposite directions inside the pump body. The incoming effluent gas can be drawn into the pump through the inlet 141 located at the opposite end from the motor 142. As the screws turn, a quantity of gas can fill the void between the screws and can be trapped between the two screws in the cylinder casing. The gas can then be compressed by the turning action of the screw, and moved to the other end of the cylinder casing 143, where it is discharged out the exhaust port 144. Evacuation at the inlet 141 can continue until the desired vacuum is reached or the pump capacity is reached. The pump can be driven by an air-cooled electric motor, such as a 15 HP motor.

The dry screw vacuum system 130 can additionally include a purge and exhaust system 146 that can be connected through the outlet 144. The waste outlet 144 of dry screw vacuum system 130 can lead to an air scrubbing or incinerating system 146 for treatment of the effluent, particularly if any effluent gases are toxic and require additional environmental processing. An air scrubbing system can include, for example, a vertical packed tower for absorbing hydrogen chloride. Hydrogen chloride can be neutralized in the following reaction:

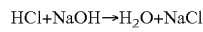

$$HCl + NaOH \rightarrow H_2O + NaCl$$

In this way, exhaust gases from the dry screw pump vacuum system 130 can be directed into an Air Scrubber System where gases and particulate are washed by solvent and released into atmosphere.

Alternatively, acidic process gas and process residues can be flushed and exhausted, for example, through a Nitrogen gas purge and Air Scrubber System. In this case, a vacuum pump seal gas purge system can used to purge the sealed chamber of the dry screw pump with nitrogen ($N_2$), so that contaminants are prevented from entering or settling in the vacuum seal area.

An internal cooling system for the individual pumps can be included based upon processing, pump sizing, and thermodynamics of the system. A manual procedure or automated purge system may be designed into the pump system in order to eliminate precipitate wastes on a routine basis.

For example, the dry screw vacuum system 130 can include a heat exchange system for temperature regulation, with ports 144 and 146 for cycling of heat exchange fluid and cooling the vacuum system 130. A separate power generation system can be incorporated to the vacuum system 130 to mitigate the environmental risk of power outages, when experienced.

In some cases, dry screw vacuum system 130 can include an automatic flush system. Acidic and corrosive process residue accumulate at various part of the dry screw vacuum system 130. Process residue build up at dry screw pump can cause pump seizure and breakdowns. To sustain vacuum capacity for a CVD process, the dry screw pumps can include an automatic flush system to remove any process reside buildups. Automatic flush systems can use water or solvent can dissolve CVD process residue and subsequently discharge those wastes to reclaim system. The automatic flush system can be customized to existing CVD processes. An example automatic flush system can include a hot water tanks, valve systems, such as solenoid valves, diaphragm pumps, level sensors, and thermocouples, which can condition and direct the solvent or water flushing out the residue. Operation of the automatic water flush system can be directed by a controller, such as controller.

Dry screw vacuum system 130 can additionally include a control panel, switches, a controller, and a user interface. In system 100, these features can be integrated with the system controller. The dry screw pump system 130 can be, for example, equipped with programmable logic controller to control the motor starters and the skid mounted devices including isolation valves, inlet purge valves, and seal gas valves solenoid. An electrical control panel can be used to control the operation of the pump and allow interface with the controller. The control panel can coordinate the various components, including switches, solenoid valves, nitrogen purging cycle, cycle run time of each pump in multiple pump systems. The panel can have a door mounted user interface for system parameter editing and monitoring of the system status.

In some cases, a liquid ring tank vacuum system can be used instead of or in addition to a dry screw vacuum system. The liquid ring tank vacuum system 150 can include an inlet 152, a filter 154, a mechanical pump 156, valves 158, a second pump 160, a liquid ring tank 162, a tank water source 164, a tank water reclamation 166, a waste outlet 168, and heat exchange ports 170, 172. The liquid ring tank vacuum system 150 can include similar components to those of dry screw pump vacuum system 130, except where otherwise noted.

Similarly, effluent can enter the liquid ring tank vacuum system 150 through an inlet 152. A pressure sensor can be located on or along the inlet 152 so as to monitor incoming gas pressure. Like the dry screw vacuum system 130, the liquid ring based vacuum system 150 can include a filter 154 for removal of solid waste upstream of the mechanical pump 156 and the second pump 160, which can induce a vacuum in the system 100. The filter 154 can be an inlet trap, a knockout pot, or other type of filter depending on the capacity of solids removal needed in the system 100. The valves 158 in liquid ring vacuum system 150 can allow for manipulation of the flow of the effluent.

However, vacuum system 150 additionally contains a liquid ring tank 162 for neutralizing effluent gases. A liquid ring tank is an automatic method of neutralizing acidification that occurs. For example, in a liquid ring tank, the following neutralization of hydrogen chloride can occur:

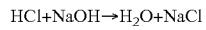

This inclusion of a liquid rink tank can reduce system maintenance. A manual or automatic water fill system can add water from the tank water source 164 if the tank level drops below a minimum height. The liquid ring tank 162 can be fed automatically from facility water 164, or manually from city water. Water needing processing and reclamation can be cycled out of the liquid ring tank 162 at outlet 166 to a scrubber. The tank water reclamation 166 can include a solids filtering process can be included in the liquid ring tank to eliminate entrained precipitates from the liquid tank. The liquid ring tank vacuum system 150 can optionally include a waste outlet 168 to an air scrubber or incinerator as needed. The liquid ring tank 162 can be pH regulated by a caustic metering pump as desired. The liquid ring tank can be cooled through a heat exchange system, such as by using a refrigerant cycled through inlet 170 and outlet 172.

In liquid ring vacuum system, mechanical pump 156 and second pump 160 together can induce a vacuum of about 0.5 Torr to about 3.5 Torr to pull effluent from CVD outflow into liquid ring tank 162. Vacuum capacity can be attained from any combination of mechanical pump, roots pump, rotary vane pump, venturi water pump, dry vacuum (e.g., lobe or screw) pumps, or other pumps based upon the needs of the CVD system chosen. One or multiple pumps can be placed in-line on a given system to provide the vacuum level capacity required as well as incorporating design needs for downstream effluent processing. The mechanical pump 156 can be, for example, cooled by a chiller water supply, and optionally driven by a motor. Similarly, the second pump 160 can be driven by a motor.

The system 100 can be regulated by a data acquisition, a power source, and a controller. The data acquisition hub can allow for upstream and downstream program control of the CVD process and provide for discrepant operation alerts. The power source can be a universal power supply system that has the ability to react real-time to the current state of the incoming electrical supply and that can include supplemental power to controlling valves within the system as needed to mitigate discrepant operating conditions.

The controller can communicate with the data acquisition hub. The controller can allow automatic control of the vacuum system valves and can be part of the system to minimize discrepant processing due to poor power supply conditions, equipment or manual interruption.

The controller can include a processor and a memory such as to permit the controller to communicate with and control the vacuum systems 130, 150, various valves, and other components of the system 100.

The controller can operate as a standalone device or may be networked to other machines. The controller can include a hardware processor, such as a central processing unit (CPU), a graphics processing unit (GPU), a hardware processor core, or any combinations thereof. The controller can further include a memory, including a main memory and a static memory. The controller can include an input device, such as a keyboard, a user interface, and a navigation device such as a mouse or touchscreen.

The controller can additionally include a storage device, a signal generation device, a network interface device, and one or more sensors. The storage device can include a machine readable medium on which is stored one or more sets of data structure or instructions embodying or utilized by any one or more of the techniques described herein. The instructions may also reside, completely or at least partially, within the main memory, within static memory, or within the hardware processor during execution thereof by the controller.

In an example, one or any combination of the hardware processor, the main memory, the static memory, or the storage device may constitute machine readable media, that may include any medium that is capable of storing, encoding, or carrying instructions for execution by the controller and that cause the controller to perform any one or more of the techniques of the present disclosure, or that is capable of storing, encoding or carrying data structures used by or associated with such instructions. Non-limiting machine readable medium examples may include solid-state memories, and optical and magnetic media. The instructions on the controller may further be transmitted or received over a communications network using a transmission medium via a network interface device.

In system 100, the controller can receive one or more sensed signals such as from pressure transducers through the system 100, and alter the function of the system 100 accordingly, such as by manipulating valves or vacuum pumps.

Figure 2:
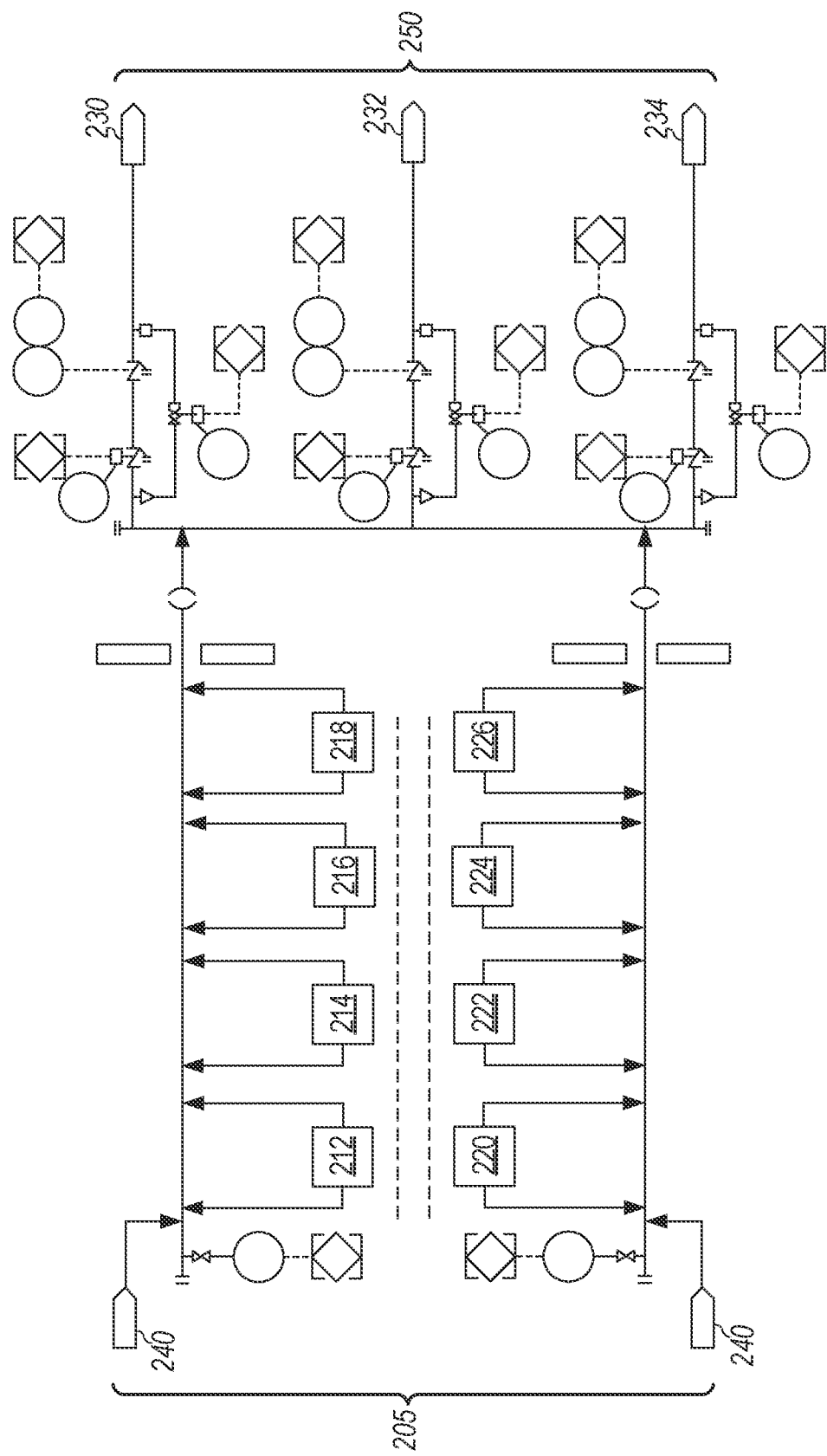
FIG. 2 illustrates a schematic diagram of a chemical vapor deposition effluent processing system manifold.

FIG. 2 illustrates a schematic diagram of a chemical vapor deposition effluent processing system 200 including a CVD manifold for processing effluent from multiple furnaces simultaneously. An example system 200 with a CVD manifold 205 including eight CVD furnaces 212, 214, 216, 218, 220, 222, 224, 226, and a vacuum manifold 229 with three vacuum systems 230, 232, 234, is exhibited in FIG. 2. Here, the CVD systems are in parallel, with a single inlet for chloride gas 240, and a single outlet to a vacuum manifold 250. The CVD furnaces in the manifold 205 can be of the same type or different variants. Similarly, the vacuum systems in the vacuum manifold can be the same type of vacuum systems, or various types.

In this manifold 200, any of the CVD furnaces 210, 212, 214, 216, 218, 220, 222, 224, 226 can be shut on or off at a given time, can be used for CVD, or can be closed off for maintenance with valve systems. Similarly, effluent from each of the CVD furnaces can be routed to one or split between the vacuum systems 230, 232, 234. This can be tailored depending on the desired treatment and which CVD furnaces are running.

The use of multiple CVD furnaces in parallel, feeding into a single effluent processing system containing multiple vacuum components can allow for processing of a large volume of CVD waste, such as corrosive gaseous exhaust and solids, simultaneously.

VARIOUS NOTES & EXAMPLES

Each of these non-limiting examples can stand on its own, or can be combined in various permutations or combinations with one or more of the other examples.

Example 1 can include a system for processing waste from a chemical vapor deposition process, the system comprising: an inlet configured to be connected to one or more chemical vapor deposition systems, the inlet configured for receiving an effluent comprising one or more waste gases, a vacuum component in fluid communication with the inlet, the vacuum component configured for maintaining a vacuum of about 0.5 Torr to about 3.5 Torr and actuatable for removing the one or more waste gases from the one or more chemical vapor deposition systems, a fluid line, wherein the vacuum component being in fluid communication with the inlet comprises the fluid line fluidly connecting the inlet to the vacuum component, and a controller in communication with the vacuum component.

Example 2 can include Example 1, further comprising one or more chemical vapor deposition systems connected to the inlet.

Example 3 can include any of Examples 1-2, further comprising a neutralizing apparatus for neutralizing the one or more waste gases.

Example 4 can include any of Examples 1-3, wherein the neutralizing apparatus is integrated with the vacuum component.

Example 5 can include any of Examples 1-4, wherein the neutralizing apparatus comprises an air scrubber, a gas purge system, or an incinerator.

Example 6 can include any of Examples 1-5, wherein the effluent further comprises one or more waste solids.

Example 7 can include any of Examples 1-6, further comprising at least one waste solid removal outlet.

Example 8 can include any of Examples 1-7, further comprising one or more filters configured to remove the one or more waste solids from the effluent.

Example 9 can include any of Examples 1-8, wherein the vacuum component is configured to provide a vacuum of at least about 2 Torr.

Example 10 can include any of Examples 1-9, wherein the vacuum component comprises a first pump and a second pump.

Example 11 can include any of Examples 1-10, wherein the vacuum component further comprises a filter to prevent influx of solid waste into the first and second vacuum pumps.

Example 12 can include any of Examples 1-11, wherein at least one of the first and second pumps comprises a dry screw pump.

Example 13 can include any of Examples 1-12, wherein the vacuum component further comprises a liquid ring tank.

Example 14 can include any of Examples 1-13, further comprising an automatic flush system configured to dissolve the one or more waste gases with a solvent.

Example 15 can include a system for processing waste from a chemical vapor deposition process, the system comprising: a plurality of chemical vapor deposition systems; a chemical vapor deposition manifold for receiving an effluent comprising one or more waste gases from the plurality of chemical vapor deposition systems; a plurality of vacuum systems in fluid communication with the chemical vapor deposition manifold, the vacuum system configured for maintaining a vacuum of at least about 0.5 Torr to about 3.5 Torr and actuatable for removing the one or more waste gases from the plurality of chemical vapor deposition systems; and a fluid line, wherein the plurality of vacuum systems being in fluid communication with the chemical vapor deposition manifold comprises the fluid line fluidly connecting the chemical vapor deposition manifold to the plurality of vacuum systems.

Example 16 can include Example 15, further comprising a controller in communication with the plurality of vacuum systems.

Example 17 can include a method of processing waste from a chemical vapor deposition process, the method comprising: receiving effluent from a chemical vapor deposition system, the effluent comprising one or more waste gases and one or more waste solids; applying a vacuum to the effluent; and expelling the effluent.

Example 18 can include Example 17, further comprising neutralizing the one or more waste gases.

Example 19 can include any of Examples 17-18, further comprising filtering the one or more waste solids.

Example 20 can include any of Examples 17-19, further comprising expelling the one or more waste solids prior to applying a vacuum to the effluent.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for processing waste from a chemical vapor deposition process, the system comprising:
   an inlet configured to be connected to one or more chemical vapor deposition systems, the inlet configured for receiving an effluent comprising one or more waste gases;
   a controlling valve coupled to the inlet to regulate a flow of the effluent in the system;
   a vacuum component in fluid communication with the inlet, the vacuum component configured for maintaining a vacuum of about 0.5 Torr to about 3.5 Torr and actuatable for removing the one or more waste gases from the one or more chemical vapor deposition systems;
   a fluid line, wherein the vacuum component being in fluid communication with the inlet comprises the fluid line fluidly connecting the inlet to the vacuum component;
   a solid residue control system upstream of the vacuum component, configured to remove solid residues from the effluent; and
   a controller in communication with the vacuum component and the solid residue control system, wherein the controller is configured to:
      receive, a signal from a pressure transducer, the signal indicative of a pressure of the one or more waste gases; and
      control, based on the pressure of the one or more waste gases, (i) the vacuum component to regulate the vacuum, and (ii) the controlling valve to regulate the flow of effluent into the system, to maintain a consistent vacuum level in the one or more chemical vapor deposition systems.

2. The system of claim 1, further comprising one or more chemical vapor deposition systems connected to the inlet.

3. The system of claim 1, further comprising a neutralizing apparatus for neutralizing the one or more waste gases.

4. The system of claim 3, wherein the neutralizing apparatus is integrated with the vacuum component.

5. The system of claim 3, wherein the neutralizing apparatus comprises an air scrubber, a gas purge system, or an incinerator.

6. The system of claim 1, wherein the effluent further comprises one or more waste solids.

7. The system of claim 6, further comprising at least one waste solid removal outlet.

8. The system of claim 6, further comprising one or more filters configured to remove the one or more waste solids from the effluent.

9. The system of claim 1, wherein the vacuum component is configured to provide a vacuum of at least about 2 Torr.

10. The system of claim 1, wherein the vacuum component comprises a first pump and a second pump.

11. The system of claim 10, wherein the vacuum component further comprises a filter to prevent influx of solid waste into the first and second vacuum pumps.

12. The system of claim 10, wherein at least one of the first and second pumps comprises a dry screw pump.

13. The system of claim 10, wherein the vacuum component further comprises a liquid ring tank.

14. The system of claim 1, further comprising an automatic flush system configured to dissolve the one or more waste gases with a solvent.

15. A system for processing waste from a chemical vapor deposition process, the system comprising:
   a plurality of chemical vapor deposition systems;
   a chemical vapor deposition manifold for receiving an effluent comprising one or more waste gases from the plurality of chemical vapor deposition systems;
   a controlling valve coupled to the chemical vapor deposition manifold to regulate a flow of the one or more waste gases into the system;
   a plurality of vacuum systems in fluid communication with the chemical vapor deposition manifold, the vacuum system configured for maintaining a vacuum of at least about 0.5 Torr to about 3.5 Torr and actuatable for removing the one or more waste gases from the plurality of chemical vapor deposition systems;
   a fluid line, wherein the plurality of vacuum systems being in fluid communication with the chemical vapor deposition manifold comprises the fluid line fluidly connecting the chemical vapor deposition manifold to the plurality of vacuum systems; and
   a controller in communication with the plurality of vacuum systems, the controller configured to:
      receive, a signal from a pressure transducer, the signal indicative of a pressure of the one or more waste gases; and
      control, based on the pressure of the one or more waste gases, (i) the vacuum system to regulate the vacuum, and (ii) the controlling valve to regulate the flow of effluent into the system, to maintain a consistent vacuum level in the plurality of chemical vapor deposition systems.

16. The system of claim 15, further comprising a solid residue control system upstream of the plurality of vacuum systems, configured to remove solid residues from the effluent.

* * * * *